US006855184B2

United States Patent
Naito

(10) Patent No.: US 6,855,184 B2
(45) Date of Patent: Feb. 15, 2005

(54) NIOBIUM POWDER, SINTERED BODY THEREOF AND CAPACITOR USING THE SAME

(75) Inventor: Kazumi Naito, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/483,297

(22) PCT Filed: Apr. 25, 2003

(86) PCT No.: PCT/JP03/05351

§ 371 (c)(1),
(2), (4) Date: Jan. 9, 2004

(87) PCT Pub. No.: WO03/091466

PCT Pub. Date: Nov. 6, 2003

(65) Prior Publication Data

US 2004/0182199 A1 Sep. 23, 2004

Related U.S. Application Data

(60) Provisional application No. 60/376,224, filed on Apr. 30, 2002.

(30) Foreign Application Priority Data

Apr. 26, 2002 (JP) ....................................... 2002-125083

(51) Int. Cl.$^7$ ............................ B22F 1/00; H01G 9/042
(52) U.S. Cl. ............................ 75/255; 75/245; 361/528
(58) Field of Search .................... 75/255, 245; 361/528

(56) References Cited

U.S. PATENT DOCUMENTS 6,540,810 B2 *  4/2003  Naito et al. ................... 75/255

FOREIGN PATENT DOCUMENTS

| WO | WO 98/38660 A1 | 9/1998 |
| WO | WO 00/67936 A1 | 11/2000 |
| WO | WO 02/45106 A2 | 6/2002 |

OTHER PUBLICATIONS

International Search Report for PCT/JP03/05351 dated Jul. 22, 2003.

* cited by examiner

Primary Examiner—Ngoclan T. Mai
(74) Attorney, Agent, or Firm—Sughrue Mion, PLLC

(57) ABSTRACT

The present invention relates to a niobium powder for a capacitor having Mg and Zr contents each of 50 to 400 mass ppm, a W content of 20 to 200 mass ppm and a Ta content of 300 to 3,000 mass ppm, with the contents of elements other than oxygen, nitrogen, hydrogen, Mg, Zr, W and Ta, each being 50 mass ppm or less, a sintered body using the powder and the capacitor using the sintered body. The capacitor using the sintered body made of the niobium powder of the present invention has a large capacitance per unit mass and good heat resistance property.

22 Claims, No Drawings

NIOBIUM POWDER, SINTERED BODY THEREOF AND CAPACITOR USING THE SAME

CROSS REFERENCE TO THE RELATED APPLICATIONS

This is an application based on the prescription of 35 U.S.C. Section 111(a) with claiming the benefit of filing date of U.S. Provisional Application Ser. No. 60/376,224 filed Apr. 30, 2002 under the provision of 35 U.S.C. 111(b), pursuant to 35 U.S.C. Section 119(e)(1).

TECHNICAL FIELD

The present invention relates to a niobium powder capable of stably producing a capacitor having a large capacitance per unit mass and good heat resistance property, and also relates to a sintered body using the powder and a capacitor using the sintered body.

BACKGROUND ART

Capacitors for use in electronic instruments such as cellular telephones and personal computers are demanded to have a small size and a large capacitance. Among these capacitors, a tantalum capacitor is preferred because of its large capacitance for the size and good performance. In this tantalum capacitor, a sintered body of tantalum powder is generally used for the anode material. In order to increase the capacitance of the tantalum capacitor, it is necessary to increase the mass of the sintered body or use a sintered body increased in the surface area by pulverizing the tantalum powder.

The method of increasing the mass of the sintered body necessarily involves enlargement of the capacitor shape and cannot satisfy the requirement for downsizing. On the other hand, in the method of pulverizing tantalum powder to increase the specific surface area, the pore size of the tantalum sintered body decreases or closed pores increase at the stage of sintering and this makes it difficult to impregnate a cathode agent in the later step. As one of means for solving these problems, a capacitor using a sintered body of a material having a dielectric constant larger than that of tantalum, is being studied. Niobium is known as the material having a larger dielectric constant. Niobium and tantalum belong to the same group and therefore, tantalum is present as an impurity in niobium.

JP-A-2001-307963 (the term "JP-A" as used herein means an "unexamined published Japanese patent application") (U.S. Pat. No. 6,540,810) discloses that when a niobium powder is purified to obtain a niobium powder reduced in the tantalum content to 700 mass ppm or less, and a sintered body and then a capacitor are produced using this powder, the CV value or capacitance is not decreased. However, if a purification step is provided in the production process, the production time of niobium powder is prolonged and the recovery decreases.

DISCLOSURE OF THE INVENTION

An object of the present invention is to provide a capacitor having a large capacitance per unit mass and good heat resistance property, a sintered body giving the capacitor, and a niobium powder giving the sintered body.

As a result of extensive investigations, the present inventors have found that the above-described object can be attained by adjusting the niobium powder composition to a specific range of not necessarily requiring the purification of the niobium powder.

More specifically, the present invention relates to the following niobium powder, sintered body thereof, capacitor using the sintered body and electric device and electric instrument using the capacitor.

(1) A niobium powder having Mg and Zr contents each of 50 to 400 mass ppm, a W content of 20 to 200 mass ppm and a Ta content of 300 to 3,000 mass ppm, with the contents of elements other than oxygen, nitrogen, hydrogen, Mg, Zr, W and Ta, each being 50 mass ppm or less.

(2) The niobium powder as described in 1 above, wherein the oxygen content is from 4,000 to 100,000 mass ppm.

(3) The niobium powder as described in 1 or 2 above, wherein the nitrogen content is from 20 to 200,000 mass ppm.

(4) The niobium powder as described in any one of 1 to 3 above, wherein the hydrogen content is from 5 to 200 mass ppm.

(5) The niobium powder as described in any one of 1 to 4 above, wherein the average particle size of primary powder is from 0.1 to 5 μm.

(6) The niobium powder, wherein the average particle size of secondary powder obtained by granulating the primary powder as described in 5 above is from 50 to 300 μm.

(7) The niobium powder as described in any one of 1 to 6 above, wherein the BET specific surface area is from 0.5 $m^2/g$ to 40 $m^2/g$.

(8) The niobium powder as described in any one of 1 to 7 above, wherein the CV value is from 80,000 to 200,000 μFV/g.

(9) A sintered body using the niobium powder described in any one of 1 to 8 above.

(10) The sintered body as described in 9 above, wherein the BET specific surface area is from 0.5 $m^2/g$ to 7 $m^2/g$.

(11) A capacitor comprising the niobium sintered body described in 9 or 10 above as one electrode, a dielectric material formed on the surface of the sintered body, and the other electrode provided on the dielectric material.

(12) The capacitor as described in 11 above, wherein the dielectric material mainly comprises niobium oxide.

(13) The capacitor as described in 11 above, wherein the material of the other electrode is at least one member selected from the group consisting of an electrolytic solution, an organic semiconductor and an inorganic semiconductor.

(14) The capacitor as described in 13 above, wherein the material of the other electrode is an organic semiconductor and the organic semiconductor is at least one member selected from the group consisting of an organic semiconductor comprising a benzopyrroline tetramer and chloranile, an organic semiconductor mainly comprising tetrathiotetracene, an organic semiconductor mainly comprising tetracyanoquinodimethane and an electrically conducting polymer.

(15) The capacitor as described in 14 above, wherein the electrically conducting polymer is at least one member selected from polypyrrole, polythiophene, polyaniline and substitution derivatives thereof.

(16) The capacitor as described in 14 above, wherein the electrically conducting polymer is an electrically conducting polymer obtained by doping a dopant into a polymer comprising a repeating unit represented by the following formula (1) or (2):

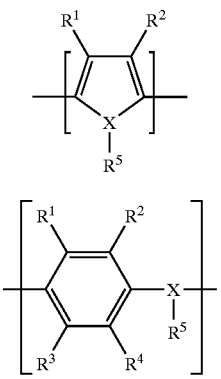

wherein $R^1$ to $R^4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of the pair of $R^1$ and $R^2$ and the pair of $R^3$ and $R^4$ may combine to each other at an arbitrary position to form a divalent chain for forming at least one 3-, 4-, 5-, 6- or 7-membered saturated or unsaturated hydrocarbon cyclic structure together with the carbon atoms substituted by these groups; the cyclic bond chain may contain a bond of carbonyl, ether, ester, amide, sulfide, sulfinyl, sulfonyl or imino at an arbitrary position; X represents an oxygen atom, a sulfur atom or a nitrogen atom; $R^5$ is present only when X is a nitrogen atom, and independently represents hydrogen or a linear or branched, saturated or unsaturated alkyl group having from 1 to 10 carbon atoms.

(17) The capacitor as described in 16 above, wherein the electrically conducting polymer is an electrically conducting polymer comprising a repeating unit represented by the following formula (3):

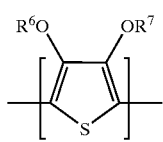

wherein $R^6$ and $R^7$ each independently represents a hydrogen atom, a linear or branched, saturated or unsaturated-alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position and the cyclic structure includes a structure having a vinylene bond which may be substituted and a phenylene structure which may be substituted.

(18) The capacitor as described in 17 above, wherein the electrically conducting polymer is an electrically conducting polymer obtained by doping a dopant to poly(3,4-ethylenedioxythiophene).

(19) The capacitor as described in 11 above, wherein the other electrode is formed of a material having a layer structure at least partially.

(20) The capacitor as described in 11 above, wherein the other electrode is formed of a material containing an organic sulfonate anion as a dopant.

(21) An electronic circuit using the capacitor described in any one of 11 to 20 above.

(22) An electronic instrument using the capacitor described in any one of 11 to 20 above.

MODE FOR CARRYING OUT THE INVENTION

One embodiment for obtaining the niobium powder of the present invention is described below.

For the production of the niobium powder of the present invention, a generally available niobium material can be used. For example, the niobium powder of the present, invention can be obtained by reducing niobium halide with magnesium or sodium, reducing potassium niobium fluoride with sodium, electrolyzing potassium niobium fluoride with a molten salt (NaCl+KCl) on a nickel cathode, reducing niobium pentoxide with an alkali metal, an alkaline earth metal, carbon or hydrogen, or introducing hydrogen into a niobium ingot and then pulverizing/dehydrogenating the ingot.

The niobium powder of the present invention has a tantalum content of 300 to 3,000 mass ppm, preferably 700 to 3,000 mass ppm.

By controlling the contents of specific elements described later to respective specific ranges, the CV value or capacitance of the sintered body or capacitor using the niobium power can be prevented from reduction without intentionally reducing the tantalum content to 700 mass ppm or less as described in JP-A-2001-307963 (U.S. Pat. No. 6,540,810). Furthermore, the capacitor using the niobium powder advantageously exhibits a good value in the high-temperature load test.

The niobium powder of the present invention comprises Mg and Zr each in a content of 50 to 400 mass ppm and W in a content of 20 to 200 mass ppm. The content of elements other than oxygen, nitrogen, hydrogen, Mg, Zr, W and Ta is each 50 mass ppm or less. If the contents of these elements are out of their respective ranges, it is difficult to maintain good results in all of those CV value, capacitance and high-temperature load test value.

The niobium powder of the present invention comprising the above-described contents of Mg, Zr and W elements may be obtained, for example, by mixing respective elements or a compound containing these elements with the above-described niobium powder. Niobium powder generally obtained scarcely comprises Mg and Zr each in a content of 400 mass ppm or more, W in a content of 200 mass ppm or more, Ta in a content of 3,000 mass ppm or more, and elements other than oxygen, nitrogen, hydrogen, Mg, Zr, W and Ta, each in a content of 50 mass ppm or more. The niobium powder of the present invention may be obtained by adding Mg, Zr and W and the niobium powder need not be purified, therefore, the niobium powder can be produced in a high yield without spending much time.

The timing of adding these elements to the niobium powder may be after the production of the above-described niobium powder or at an arbitrary stage during the production, however, the preferred timing for mixing is desirably determined in advance by a preliminary test. Also, at least one apparatus for obtaining the niobium powder may be made of a material containing those specific elements and designed such that the elements each in a predetermined amount are mixed in the niobium powder by the abrasion with the apparatus at the production of the niobium powder.

The thus-obtained niobium powder usually contains hydrogen and carbon each in a content of 5 to 200 mass ppm. The niobium powder of the present invention forms a natural oxide film in air at room temperature. In this case, the amount of oxygen contained is usually from 4,000 to 100,000 mass ppm, though this varies depending on the particle size of the niobium powder. The oxygen content may be decreased by reducing the natural oxide film of niobium using a reducing agent such as magnesium, calcium or hydrogen. For example, a niobium powder having an oxygen content of 8,000 mass ppm or 80,000 mass ppm may be reduced to obtain a niobium powder having an oxygen content of 5,000 mass ppm.

In the present invention, the niobium powder and/or the secondary powder which is described later may be partially nitrided before use. The niobium powder can be partially nitrided, for example, by nitriding the niobium powder in a nitrogen gas atmosphere. In this case, the amount of nitrogen is preferably set to 20 to 200,000 mass ppm and more preferably from 100 to 30,000 mass ppm for producing a capacitor having a good leakage current value. The nitrided amount as used herein means the amount of nitrogen chemically bonded to the niobium powder but not the amount of nitrogen adsorbed to the niobium powder.

The nitridation of the niobium powder may be performed by any one of liquid nitridation, ion nitridation and gas nitridation or by a combination of these methods. The gas nitridation in a nitrogen gas atmosphere is preferred because the apparatus is simple and the operation is easy. For example, the gas nitridation in a nitrogen gas atmosphere can be attained by allowing the niobium powder to stand in a nitrogen gas atmosphere. A niobium powder having an objective nitrided amount can be obtained by the nitridation at an atmosphere temperature of 2,000° C. or less for a standing time of several hours or less. The treatment time can be shortened by treating the niobium powder at a higher temperature. The nitrided amount of the niobium powder can be controlled under the conditions determined by a preliminary test for confirming the nitridation temperature and nitridation time of the material to be nitrided.

The average particle size of the niobium powder of the present invention is from 0.1 $\mu$m to less than 5 $\mu$m, preferably from 0.2 $\mu$m to less than 2 $\mu$m. If the average particle size is 5 $\mu$m or more, the sintered body obtained itself has a small CV value and makes it difficult to produce a capacitor having a large capacitance, therefore, this is not preferred. Whereas if it is less than 0.1 $\mu$m, the material of the other electrode cannot be easily impregnated and the capacitance is rather decreased disadvantageously. The powder of the present invention having an average particle size within the above-described range has a specific surface area of 0.5 m$^2$/g to 40 m$^2$/g. The powder for capacitors of the present invention may be granulated to a predetermined size and used in the form a secondary powder.

The granulation may be performed by a conventionally known method. Examples of the method include a method where the powder is left standing in a vacuum at a high temperature of 500° C. to 2,000° C. and then subjected to wet or dry cracking, a method where the powder is mixed with an appropriate binder such as acrylic resin or polyvinyl alcohol and then cracked, and a method where the powder is mixed with an appropriate compound such as acrylic resin or camphor, left standing in a vacuum at a high temperature and then subjected to wet or dry cracking. The particle size of the granulated powder can be freely varied by the degree of granulation and cracking, however, a granulated powder having an average particle size of 50 $\mu$m to 300 $\mu$m is usually used. After the granulation and cracking, the powder may be classified. Also, an appropriate amount of the powder before granulation may be added to the granulated powder. The granulated powder produced as such usually has a BET specific surface area of 0.4 to 20 m$^2$/g.

When a sintered body is produced from the niobium powder of the present invention as described later and electrochemically formed in an aqueous 0.1% phosphoric acid solution at 80° C. and a predetermined voltage for 300 minutes, the sintered body exhibits a CV value of 80,000 to 200,000 $\mu$FV/g (this is a value measured in a 30% aqueous solution of sulfuric acid at room temperature and 120 Hz with 1.5 V bias for 30 seconds).

The sintered body of the present invention can be produced by sintering the above-described powder. One example of the production methods for the sintered body is described below, however, the production method of the sintered body is not limited to this example. For example, the sintered body is obtained by press-molding the powder into a predetermined shape and heating the molded article at 500 to 2,000° C. under 10$^{-4}$ to 10$^{-1}$ Pa for a few minutes to a few hours. The sintered body of the present invention usually has a specific surface area of 0.5 m$^2$/g to 7 m$^2$/g.

A lead wire comprising a valve-acting metal such as niobium or tantalum and having an appropriate shape and an appropriate length may be prepared and integrally molded at the press-molding of the powder by inserting a part of the lead wire inside the molded article, so that the lead wire can work out to an outgoing lead of the sintered body.

Using the above-described sintered body as one electrode, a capacitor can be produced by interposing a dielectric material between this electrode and the other electrode (counter electrode). Examples of the dielectric material of the capacitor include dielectric materials mainly comprising niobium oxide or tantalum oxide. The dielectric material mainly comprising niobium oxide can be obtained, for example, by electrochemically forming the niobium sintered body as one electrode in an electrolytic solution. For electrochemically forming the niobium electrode in an electrolytic solution, an aqueous protonic acid solution is generally used, such as an aqueous 0.1% acetic acid or sulfuric acid solution. In the case of obtaining a dielectric material mainly comprising niobium oxide by electrochemically forming the niobium electrode in an electrolytic solution, the capacitor of the present invention is an electrolytic capacitor and the niobium side serves as an anode.

The other electrode in the capacitor of the present invention is at least one compound selected from an organic semiconductor and an inorganic semiconductor. Specific examples of the organic semiconductor include an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer comprising a repeating unit represented by following formula (1) or (2):

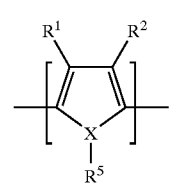

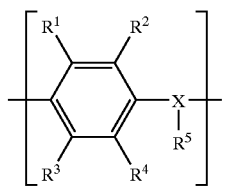
(2)

wherein $R^1$ to $R^4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of the pair of $R^1$ and $R^2$ and the pair of $R^3$ and $R^4$ may combine to each other at an arbitrary position to form a divalent chain for forming at least one 3-, 4-, 5-, 6- or 7-membered saturated or unsaturated hydrocarbon cyclic structure together with the carbon atoms substituted by these groups; the cyclic bond chain may contain a bond of carbonyl, ether, ester, amide, sulfide, sulfinyl, sulfonyl or imino at an arbitrary position; X represents an oxygen atom, a sulfur atom or a nitrogen atom; $R^5$ is present only when X is a nitrogen atom, and independently represents hydrogen or a linear or branched, saturated or unsaturated alkyl group having from 1 to 10 carbon atoms.

In the present invention, the electrically conducting polymer comprising a repeating unit represented by formula (1) is preferably an electrically conducting polymer comprising a structure unit represented by the following formula (3) as a repeating unit:

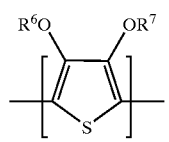
(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position and the cyclic structure includes a structure having a vinylene bond which may be substituted, and a phenylene structure which may be substituted. The electrically conducting polymer containing such a chemical structure is electrically charged and a dopant is doped thereto. For the dopant, known dopants can be used without limitation.

Examples of the polymer containing a repeating unit represented by any one of formulae (1) to (3) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

Specific examples of the inorganic semiconductor include an inorganic semiconductor mainly comprising lead dioxide or manganese dioxide, and an inorganic semiconductor comprising tri-iron tetroxide. These semiconductors may be used individually or in combination of two or more thereof.

When the organic or inorganic semiconductor used has an electrical conductivity of $10^{-2}$ to $10^3$ S/cm, the produced capacitor can have a smaller impedance value and a larger capacitance at a high frequency.

In the case where the other electrode is solid, an electrically conducting layer may be provided thereon so as to attain good electrical contact with an exterior outgoing lead (for example, lead frame). The electrically conducting layer can be formed, for example, by the solidification of an electrically conducting paste, plating, metallization or formation of a heat-resistant electrically conducting resin film. Preferred examples of the electrically conducting paste include silver paste, copper paste, aluminum paste, carbon paste and nickel paste, and these may be used individually or in combination of two or more thereof. In the case of using two or more kinds of pastes, the pastes may be mixed or may be superposed one on another as separate layers. The electrically conducting paste applied is then solidified by allowing it to stand in air or under heating. Examples of the plating include nickel plating, copper plating, silver plating and aluminum plating. Examples of the vapor-deposited metal include aluminum, nickel, copper and silver.

More specifically, for example, carbon paste and silver paste are stacked in this order on the other electrode and the whole is sealed with a material such as epoxy resin, thereby fabricating a capacitor. The capacitor may have a niobium or tantalum lead which is sintered and molded integrally with the above-described sintered body or welded afterward.

The thus-fabricated capacitor of the present invention is jacketed using, for example, resin mold, resin case, metallic jacket case, dipping of resin or laminate film, and then used as a capacitor product for various uses.

BEST MODE FOR CARRYING OUT THE INVENTION

The present invention is described in greater details below by referring to Examples and Comparative Examples but is not particularly limited to the following examples.

The nitrided amount of the powder in each example was determined using a nitrogen-oxygen analyzer manufactured by LEKO. The CV value of the sintered body was determined from a product of an electrical formation voltage of 20 V and a capacitance measured in 30% sulfuric acid after the electrochemical formation in an aqueous 0.1% phosphoric acid solution at 80° C. for 300 minutes with an applied voltage of 20 V. As for the contents of elements other than oxygen and nitrogen in the niobium powder, Si and P were determined from ICP-AES, C and S were determined from high-frequency combustion/IR, and other elements were determined from ICP-AES. The high-temperature load test value of the capacitor was expressed by the number of units of which capacitance exceeded ±20% of the initial value when the produced capacitor was left standing at 85° C. and 4V for 1,000 hours. As the number of the units is smaller, the high-temperature load test value becomes better. The number of samples for the determination of CV value and high-temperature load test value of the capacitor using the niobium powder was 30 in each Example.

EXAMPLES 1 TO 5 AND COMPARATIVE EXAMPLES 1 TO 3

A niobium ingot having a Ta content of 1,200 mass ppm was hydrogenated and then wet pulverized to obtain a niobium powder having an average particle size of 0.78 μm and a specific surface area of 4.6 m²/g. Thereto, magnesium, zirconium oxide and ammonium tungstate were added to adjust the Mg, Zr and W contents to the amounts shown in Table 1. This powder was vacuum-heated at 1,200° C., taken out, cracked and classified to obtain a granulated powder (also called a secondary powder) having an average particle size of 90 μm and a specific surface area of 1.5 m²/g. This granulated particle was left standing in a nitrogen stream at 400° C. for 3 hours, thereby obtaining a partially nitrided niobium powder. The contents of respective elements in the obtained niobium powder were such that nitrogen was 2,500 mass ppm, oxygen was 32,000 mass ppm, hydrogen was 100 mass ppm, and the element other than oxygen, nitrogen, hydrogen, Mg, Zr, W and Ta was 40 mass ppm or less. This granulated powder was molded into a size of 1.8×3.5×4.0 mm (a niobium wire having a diameter of 0.3 mm was molded together and used as the lead) and then sintered at 1,300° C. under reduced pressure of 7×10$^{-5}$ Pa to obtain a sintered body having a specific surface area of 0.8 m²/g (the CV value of this sintered is shown in Table 1). Then, the sintered body was electrochemically formed in an aqueous 0.1% phosphoric acid solution at 80° C. and 20 V for 300 minutes. Subsequently, polypyrrole was deposited in pores inside the sintered body and on the surface thereof by repeating a reaction between pyrrole and an oxidizing agent in the presence of a dopant using ammonium persulfate as the oxidizing agent and sodium anthraquinonesulfonate as the dopant, and thereby the other electrode was formed. Furthermore, carbon paste and silver paste were stacked in this order and the whole was sealed with an epoxy resin to produce a capacitor. The measured values of Examples and Comparative Examples are shown in Table 1.

EXAMPLES 6 TO 14 AND COMPARATIVE EXAMPLES 4 TO 12

Capacitors were produced in the same manner as in Examples 1 to 3 and Comparative Examples 1 and 3 except that niobium ingots each having a tantalum content shown in Table 1 were used and the other electrode composed of a lead dioxide and lead sulfate mixture containing 98 mass % of lead oxide was formed by repeating a reaction between an aqueous lead acetate solution and an aqueous ammonium persulfate solution in pores of the sintered body. In Comparative Examples 10, 11 and 12, each of Mg, Zr and W was added to have the same content as in Examples 1, 2 and 3.

EXAMPLES 15 TO 19 AND COMPARATIVE EXAMPLES 13 TO 15

The same procedure as in Examples 1 to 5 and Comparative Examples 1 to 3 was performed except that the niobium powder was produced by reducing niobium penta-chloride having mixed therein 0.5% of tantalum penta-chloride using magnesium, and nitrided by being left to stand in a nitrogen stream at 450° C. for 3 hours.

The niobium powder obtained had an average particle size of 0.53 to 0.78 μm and a specific surface area of 7.1 m²/g, and the granulated powder obtained had an average particle size of 120 μm and a specific surface area of 1.7 m²/g. The content of nitrogen was 8,500 mass ppm, the content of oxygen was 9,000 mass ppm, the content of hydrogen was 140 mass ppm, and the content of elements other than oxygen, nitrogen, hydrogen, Mg, Zr, W and Ta was each 40 mass ppm or less. The sintered body had a specific surface area of 1.3 m²/g. Using the sintered body obtained, capacitors were produced in the same manner as in Examples 1 to 5 and Comparative Examples 1 to 3.

TABLE 1

|  | Contents of Elements in Niobium Powder, mass ppm | | | | CV Value, μFV/g | Capacitance of Capacitor, μF | Value of High-Temperature Load Test, units |
| --- | --- | --- | --- | --- | --- | --- | --- |
|  | Ta | Mg | Zr | W |  |  |  |
| Example 1 | 1200 | 50 | 50 | 25 | 86000 | 300 | 0/30 |
| Example 2 | 1200 | 190 | 150 | 59 | 87000 | 310 | 0/30 |
| Example 3 | 1200 | 220 | 190 | 90 | 86000 | 305 | 0/30 |
| Example 4 | 1200 | 340 | 220 | 190 | 86000 | 300 | 0/30 |
| Example 5 | 1200 | 190 | 380 | 80 | 85000 | 305 | 0/30 |
| Comparative Example 1 | 1200 | 420 | 190 | 120 | 86000 | 295 | 4/30 |
| Comparative Example 2 | 1200 | 160 | 410 | 30 | 86000 | 290 | 2/30 |
| Comparative Example 3 | 1200 | 220 | 160 | 220 | 85000 | 290 | 6/30 |
| Example 6 | 350 | 55 | 50 | 30 | 84000 | 300 | 0/30 |
| Example 7 | 350 | 200 | 150 | 65 | 85000 | 305 | 0/30 |
| Example 8 | 350 | 220 | 180 | 90 | 86000 | 310 | 0/30 |
| Comparative Example 4 | 350 | 430 | 190 | 120 | 84000 | 300 | 3/30 |
| Comparative Example 5 | 350 | 230 | 160 | 220 | 84000 | 3100 | 2/30 |
| Example 9 | 2200 | 60 | 60 | 30 | 86000 | 310 | 0/30 |
| Example 10 | 2200 | 190 | 160 | 60 | 85000 | 300 | 0/30 |
| Example 11 | 2200 | 230 | 210 | 90 | 84000 | 310 | 0/30 |
| Comparative Example 6 | 2200 | 430 | 180 | 110 | 86000 | 300 | 3/30 |
| Comparative Example 7 | 2200 | 230 | 160 | 220 | 85000 | 295 | 4/30 |
| Example 12 | 2900 | 55 | 55 | 30 | 86000 | 315 | 0/30 |
| Example 13 | 2900 | 200 | 160 | 65 | 86000 | 315 | 0/30 |

TABLE 1-continued

| | Contents of Elements in Niobium Powder, mass ppm | | | | CV Value, | Capacitance of Capacitor, | Value of High-Temperature Load Test, |
|---|---|---|---|---|---|---|---|
| | Ta | Mg | Zr | W | μFV/g | μF | units |
| Example 14 | 2900 | 230 | 180 | 90 | 86000 | 315 | 0/30 |
| Comparative Example 8 | 2900 | 440 | 180 | 130 | 85000 | 295 | 3/30 |
| Comparative Example 9 | 2900 | 230 | 160 | 230 | 86000 | 295 | 4/30 |
| Comparative Example 10 | 3300 | 60 | 55 | 30 | 77000 | 260 | 3/30 |
| Comparative Example 11 | 3300 | 210 | 170 | 70 | 76000 | 255 | 3/30 |
| Comparative Example 12 | 220 | 240 | 180 | 100 | 86000 | 260 | 5/30 |
| Example 15 | 1300 | 53 | 57 | 28 | 138000 | 475 | 0/30 |
| Example 16 | 1300 | 190 | 160 | 65 | 135000 | 475 | 0/30 |
| Example 17 | 1300 | 245 | 190 | 90 | 136000 | 480 | 0/30 |
| Example 18 | 1300 | 330 | 210 | 189 | 137000 | 480 | 0/30 |
| Example 19 | 1300 | 185 | 390 | 85 | 138000 | 470 | 0/30 |
| Comparative Example 13 | 1300 | 410 | 140 | 110 | 137000 | 460 | 2/30 |
| Comparative Example 14 | 1300 | 180 | 430 | 90 | 138000 | 465 | 3/30 |
| Comparative Example 15 | 1300 | 220 | 160 | 225 | 137000 | 460 | 3/30 |

From comparison of Examples 1 to 5 with Comparative Examples 1 to 3, comparison of Examples 6 to 8 with Comparative Examples 4 and 5, comparison of Examples 9 to 11 with Comparative Examples 6 and 7, comparison of Examples 12 to 14 with Comparative Examples 8 and 9 and comparison of Examples 15 to 19 with Comparative Examples 13 to 15, and from results in Comparative Examples 10 to 12, it is seen that the sintered body and capacitor produced from the niobium powder where the contents of specific metals are controlled to respective specific amounts exhibit good results in the CV value, capacitance and high-temperature load test value, namely, heat resistance.

Industrial Applicability

The present invention provides a niobium powder for capacitors, which can be produced in a high yield without spending much time, and enables to produce a capacitor having a large capacitance per unit mass and good heat resistance property by using this powder in the capacitor.

What is claimed is:

1. A niobium powder having Mg and Zr contents each of 50 to 400 mass ppm, a W content of 20 to 200 mass ppm and a Ta content of 300 to 3,000 mass ppm, with the contents of elements other than oxygen, nitrogen, hydrogen, Mg, Zr, W and Ta, each being 50 mass ppm or less.

2. The niobium powder as claimed in claim 1, wherein the oxygen content is from 4,000 to 100,000 mass ppm.

3. The niobium powder as claimed in claim 1, wherein the nitrogen content is from 20 to 200,000 mass ppm.

4. The niobium powder as claimed in claim 1, wherein the hydrogen content is from 5 to 200 mass ppm.

5. The niobium powder as claimed in claim 1, wherein the average particle size of primary powder is from 0.1 to 5 μm.

6. The niobium powder, wherein the average particle size of secondary powder obtained by granulating the primary powder as claimed in claim 5 is from 50 to 300 μm.

7. The niobium powder as claimed in claim 1, wherein the BET specific surface area is from 0.5 $m^2$/g to 40 $m^2$/g.

8. The niobium powder as claimed in claim 1, wherein the CV value is from 80,000 to 200,000 μFV/g.

9. A sintered body using the niobium powder claimed in claim 1.

10. The sintered body as claimed in claim 9, wherein the BET specific surface area is from 0.5 $m^2$/g to 7 $m^2$/g.

11. A capacitor comprising the niobium sintered body claimed in claim 9 as one electrode, a dielectric material formed on the surface of the sintered body, and the other electrode provided on the dielectric material.

12. The capacitor as claimed in claim 11, wherein the dielectric material mainly comprises niobium oxide.

13. The capacitor as claimed in claim 11, wherein the material of the other electrode is at least one member selected from the group consisting of an electrolytic solution, an organic semiconductor and an inorganic semiconductor.

14. The capacitor as claimed in claim 13, wherein the material of the other electrode is an organic semiconductor and the organic semiconductor is at least one member selected from the group consisting of an organic semiconductor comprising a benzopyrroline tetramer and chloranile, an organic semiconductor mainly comprising tetrathiotetracene, an organic semiconductor mainly comprising tetracyanoquinodimethane and an electrically conducting polymer.

15. The capacitor as claimed in claim 14, wherein the electrically conducting polymer is at least one member selected from polypyrrole, polythiophene, polyaniline and substitution derivatives thereof.

16. The capacitor as claimed in claim 14, wherein the electrically conducting polymer is an electrically conducting polymer obtained by doping a dopant into a polymer comprising a repeating unit represented by the following formula (1) or (2):

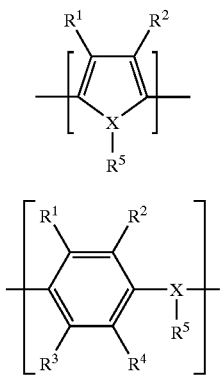

(1)

(2)

wherein $R^1$ to $R^4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of the pair of $R^1$ and $R^2$ and the pair of $R^3$ and $R^4$ may combine to each other at an arbitrary position to form a divalent chain for forming at least one 3-, 4-, 5-, 6- or 7-membered saturated or unsaturated hydrocarbon cyclic structure together with the carbon atoms substituted by these groups; the cyclic bond chain may contain a bond of carbonyl, ether, ester, amide, sulfide, sulfinyl, sulfonyl or imino at an arbitrary position; X represents an oxygen atom, a sulfur atom or a nitrogen atom; $R^5$ is present only when X is a nitrogen atom, and independently represents hydrogen or a linear or branched, saturated or unsaturated alkyl group having from 1 to 10 carbon atoms.

17. The capacitor as claimed in claim 16, wherein the electrically conducting polymer is an electrically conducting polymer comprising a repeating unit represented by the following formula (3):

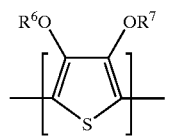

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position and the cyclic structure includes a structure having a vinylene bond which may be substituted and a phenylene structure which may be substituted.

18. The capacitor as claimed in claim 17, wherein the electrically conducting polymer is an electrically conducting polymer obtained by doping a dopant to poly(3,4-ethylenedioxythiophene).

19. The capacitor as claimed in claim 11, wherein the other electrode is formed of a material having a layer structure at least partially.

20. The capacitor as claimed in claim 11, wherein the other electrode is formed of a material containing an organic sulfonate anion as a dopant.

21. An electronic circuit using the capacitor claimed in claim 11.

22. An electronic instrument using the capacitor claimed in claim 11.

* * * * *